Jan. 16, 1968     H. BEIKE     3,364,053
METHOD OF COATING ARTICLES
Filed Oct. 5, 1964     3 Sheets-Sheet 1
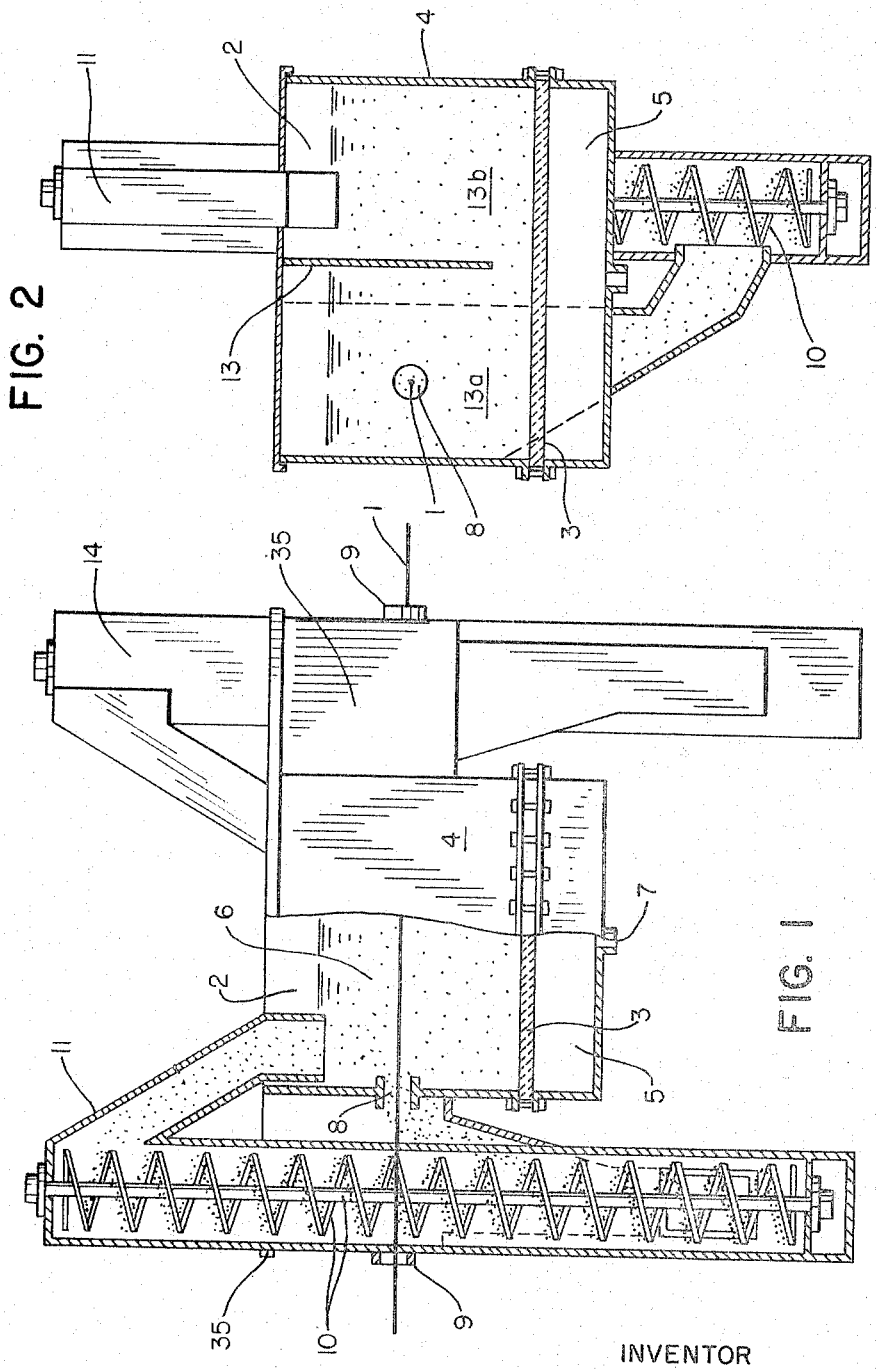
INVENTOR
HANS BEIKE
BY
ATTORNEY

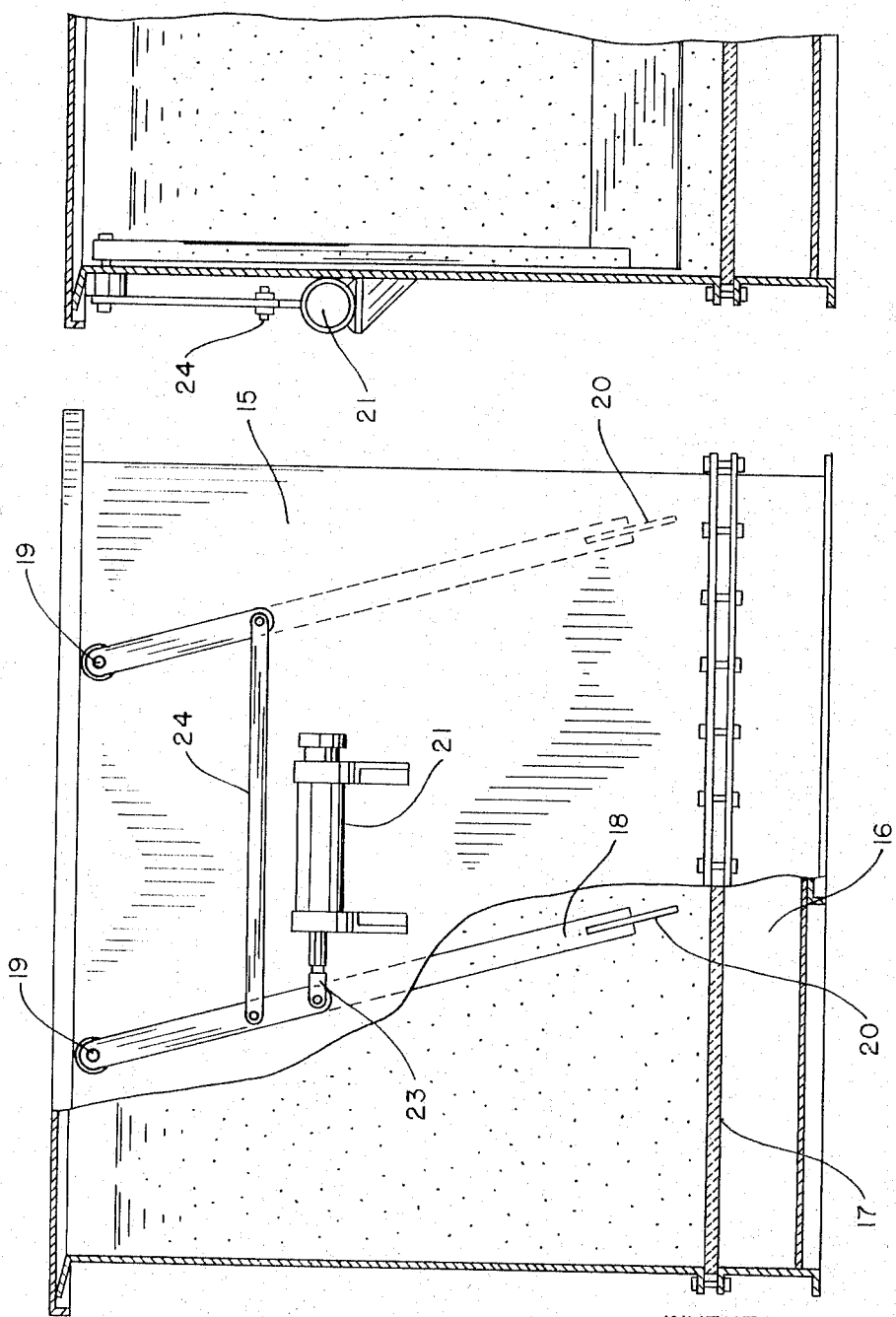

Jan. 16, 1968

H. BEIKE 3,364,053

METHOD OF COATING ARTICLES

Filed Oct. 5, 1964

INVENTOR
HANS BEIKE
BY Richard O. Church
ATTORNEY

United States Patent Office 3,364,053
Patented Jan. 16, 1968

3,364,053
METHOD OF COATING ARTICLES
Hans Beike, Kronberg, Taunus, Germany, assignor to The Polymer Corporation, a corporation of Pennsylvania
Filed Oct. 5, 1964, Ser. No. 401,329
3 Claims. (Cl. 117—21)

The present invention relates to fluidized bed processes and, in particular, to the fluidized bed coating process, as described, for example, in U.S. Patent 2,844,489.

In accordance with this method, an article is heated to above the melting point of a heat-fusible, pulverulent coating material and is dipped into a fluidized bed of such coating material. The fluidized bed is prepared in a container which is divided by a porous gas-permeable plate (gas distribution plate) into an upper chamber containing the coating material and a lower chamber into which the fluidizing gas is introduced under pressure. The fluidizing gas is uniformly distributed through the gas distribution plate into the coating material resting on the latter and loosens it to such an extent that the coating material assumes approximately the flow properties of a fluid so long as the flow of gas is continued. In this way, it is possible to obtain continuous coatings which are uniform over the entire surface of the coated articles, since the pulverulent coating material, in its loosened state, flows over and covers all of the surfaces of the article.

It has been observed that with certain pulverulent coating materials uniform fluidization is not always achieved. For example, gas channels may be formed through which a considerable portion of the fluidizing gas flows without exerting any substantial fluidizing or loosening effect on the coating material. If uniform fluidization of the coating material is not achieved, a uniform coating on the objects to be coated is no longer assured. Furthermore, the fluidizing gases may emerge from the gas channels at sufficient velocity so as to form fountains of coating material that are commonly referred to as geysers. The material which is carried along upwards by the geysers and elutriated from the bed adheres firmly to the still tacky coating layer of the article as it is removed from the bed and thereby impairs the coating. The dust that is formed by these geysers also causes a loss of coating material and undesired annoyance for the operating personnel.

In addition to the formation of channels and geysers, classification may take place during the fluidizing of the coating material causing the fine, readily fluidizable, or less dense powder particles to collect in the upper part of the fluidized bed and the coarse, denser, or difficultly fluidizable particles to collect in the lower part of the bed.

Classification of the coating materials leads to poor coatings, since, particularly with respect to long articles, the coarse particles will melt onto the lower part of the article and the finer particles will melt on the upper part. Also, since the particles will collect in the upper part of the fluidized bed, the problem of dust formation by elutriation is intensified. Furthermore, as the readily fluidizable portion of the coating material is consumed or elutriated at a greater rate than the other portion of the coating material, the fluidized bed may progressively become harder and harder to fluidize.

In order to avoid these problems, it has been proposed to use sheet metal strips arranged parallel to and alongside of each other and which are moved back and forth in horizontal direction at a slight distance above the gas distributing plate. This produces a limited movement of the powder particles adjacent the sheet metal strips but is not effective to provide for the movement of material throughout the entire fluidization bed. Accordingly, the formation of channels and geysers is reduced only to a limited extent and classification of the coating materials may take place. When the fluidized bed is rather deep, this horizontal movement is practically without effect.

Accordingly, it is an object of this invention to provide methods and means for improving the properties and fluidization characteristics of fluidized beds.

Another object of this invention is to prevent particles from classifying in fluidized beds.

Still another object of this invention is to provide methods and means whereby the elutriation of fine particles from fluidized beds may be materially reduced.

Yet another object of this invention is to prevent the formation of channels and geysers in fluidized beds.

And yet a further object of this invention is to provide methods and means that are effective to improve the quality of the coatings that are obtained in the fluidized bed coating processes.

Briefly, these and other objects are achieved by continuously circulating the fluidized particles which make up the fluidized bed. In this manner a continuous mixing of the powder particles of different size and density is obtained so that classification of the coating material is avoided. At the same time, the continuous movement of the powder in the fluidizing container acts to impede the formation of channels and geysers. Due to the reduction in classification and geysering, elutriation of fine particles is limited to a minimum.

In accordance with a further proposal of the invention, in order to obtain the circulatory movement of the coating material, a portion thereof is allowed to flow out of the fluidizing container and simultaneously at least an equal amount is introduced again at a point located in a different horizontal plane, the withdrawal being preferably effected in the upper region of the fluidized layer and the introduction in a lower region. In this way, a vertical movement of powder through the entire fluidizing container is achieved with a high degree of certainty. Also, the same apparatus will facilitate continuous replacement of the coating material as it is consumed.

Another method of producing the circulatory movement consists in using a paddle which is moved back and forth either in horizontal reciprocating motion or in pendulum-like fashion over and adjacent the gas distributing plate. By these means, there is obtained a surprising effect as compared with known apparatus in that a circulatory motion is imparted to the individual particles of the coating material present in the container, which motion prevents classification, avoids channels and geysers, and greatly reduces elutriation of the fines. It has proved useful to move the paddles back and forth at least 10 cm./sec. but not more than 80 cm./sec., and preferably between 20 and 40 cm./sec.

The manner of operation of either a horizontally moved or pendulus paddle can be substantially improved by making the paddles at least 30 mm. and preferably 100 to 200 mm. in height. This height of paddle assists the fluidization substantially, so that in combination with the movement and speed in accordance with the invention, there is obtained a very uniformly loosened fluidized bed with a uniform distribution of powder particles of different size. Such a fluidized bed gives particular uniform coatings even in thin layers.

The exact velocities selected will depend upon the properties of the material that is being fluidized. The value of 10 cm./sec. is the lower limit at which beneficial results are obtained and, in general, speeds of more than 80 cm./sec. represent the useful upper limit. To enable selection of the optimum paddle speed, it is useful to provide means for selectively varying the speed and a trained operator can readily adjust this speed to obtain the optimum results by visual observation. In addition to providing for a minimum paddle height of 30 mm., it is also preferred that the paddle be at least about 1/10 as high as the fluidized layer.

When several paddles with horizontal or pendulus movement are arranged in a fluidizing container, it may be advantageous to move the paddles in opposite directions so that they both may be stopped while at the side walls of the fluidization chamber. Also, it may be advantageous to move the paddles at different speeds to provide good circulation of the particles within the fluidized bed.

A device for obtaining circulation by withdrawal and return of a portion of the coating material consists of a fluidizing container to which there is laterally connected at least one overflow container which is provided with a conveying device to return the overflow of coating material to the fluidizing container at a different level. Preferably there is provided in the fluidizing container, spaced from the gas distribution plate, at least one retention wall by which means the coating material may be moved in a given direction through the container.

Another apparatus for obtaining circulating movement, particularly useful when high containers of relatively small cross-section are required, consists of two fluidizing chambers communicating adjacent their lower ends to enable the flow of fluidized materials. By continuously removing material from one chamber and reintroducing it into the other chamber, the difference in head pressure within the two chambers will cause a continuous circulation to take place.

Another method for obtaining circulation consists in providing a conveying device at at least one point within the fluidization chamber to move a portion of the coating material continuously in a vertical direction.

Circulation in the fluidizing container can also be obtained by dividing the gas chamber into several compartments into which fluidizing gas of different pressure flows. In this way, the coating material is fluidized at different velocities in different zones and movement is produced in the coating material. This movement can be further improved by providing partition walls corresponding to the subdivision of the gas chamber, which extend vertically within the fluidization container to act as underflow and/or overflow baffles.

Embodiments of the invention are shown in the drawings, in which:

FIG. 1 shows a fluidized bed adapted to circulate materials by the withdrawal and reintroduction of such materials.

FIG. 2 is a side view of the apparatus of FIG. 1.

FIG. 3 shows a fluidized bed in which circulation is obtained through the use of paddles.

FIG. 4 is a side view of the apparatus of FIG. 3.

Figure 5:
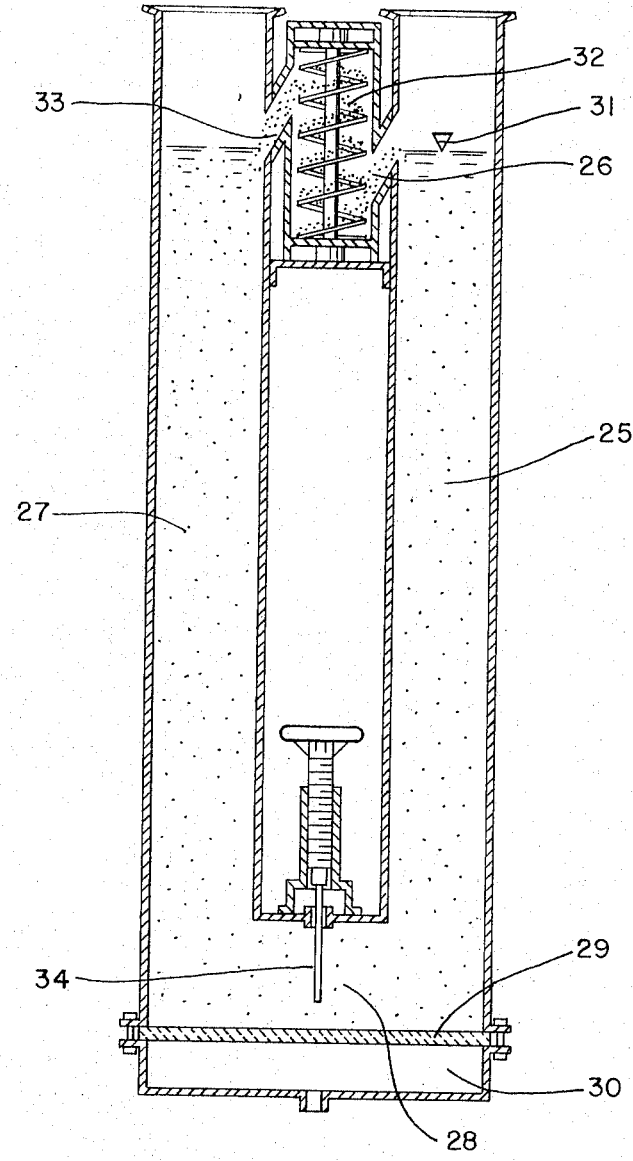
FIG. 5 shows another means for obtaining circulation within a fluidized bed.

The apparatus of FIGS. 1 and 2 is particularly useful in coating elongated articles, such as wire and pipe. The wire 1 is conducted horizontally through the fluidized bed 2 which is divided by means of a gas-permeable plate 3 into an upper chamber 4 and a lower plenum chamber 5. The pulverulent coating material 6 is contained in the upper chamber 4 into which fluidizing gases are introduced from the openings in gas distributing plate 3 via plenum chamber 5 and opening 7.

The wire 1 is introduced through the opening 9 arranged in the overflow container 35 and passes through opening 8 into the fluidized layer 6. From the fluidized layer 6 the wire passes through an opening (not shown, but similar to the opening 8 on the other side of the chamber 4) into the overflow container 35' and out into the open through the opening 9'. Upon the entrance into the fluidized layer, the wires 1 are heated, as by resistance or high frequency induction heating, to a temperature which is above the melting point of the coating material. Upon passage through the fluidized layer, the coating material melts onto the wires and forms a coating.

In order to obtain the circulatory movement in accordance with the invention, the opening 8 is so constructed that a certain amount of coating material continuously flows out of the fluidized sintering apparatus 2 into a worm conveyor 10. The conveyor 10 elevates the overflowed coating material to a discharge pipe 11 which communicates with the fluidized bed, preferably at a point somewhat below its surface. Make-up feed conveniently may be added to the recirculating coating material to replace the material that is being withdrawn from the bed as a coating on the wire 1. By removing and refeeding coating material, a circulation of the coating material is produced in the fluidized bed, as indicated, for example, by the arrows 12.

The circulation may further be improved by incorporating a retaining wall 13 that is positioned above the gas distributing plate 3 and lies in a plane parallel to the direction of movement of the wires 1. This provides a chamber 13b from which coating materials are withdrawn and a chamber 13a to which they are recirculated.

The device for producing the circulating movement which has been described above may have a corresponding device 14 associated with it on the other side of the fluidized bed apparatus.

In FIGS. 3 and 4, there is shown fluidized bed apparatus which is useful in coating articles by dipping. The apparatus has an upper chamber 15 for the fluidized coating material and a lower chamber 16 for supplying fluidizing gases, the chambers being separated by a gas distributing plate 17. In order to obtain circulatory movement, paddles 18, 18' are pivotably mounted for pendulum motion at points 19, 19' along the side wall of the apparatus. The paddles are provided with blades 20, 20' which may extend over practically the entire width of the fluidizing container. The backward and forward movement of the paddles is produced by an air motor 21 operatively connected thereto by means of levers 23, 24.

The apparatus shown in FIG. 5 is adapted to coat long articles, such as rod and pipe, which are dipped from above into the fluidized bed apparatus 25. An overflow conduit 26 and a return chamber 27 are associated with the coating chamber 25. The coating chamber 25 communicates with the return chamber 27 via a conduit 28 valved as at 34. The coating chamber 25, return chamber 27 and the conduit 28 are closed at their bottoms by a gas-permeable plate 29 delimiting the gas chamber 30. As a result of this construction, the coating material may be fluidized in all three of these parts of this device when gas under pressure is introduced into the chamber 30.

Circulatory movement of the coating material is obtained by withdrawing a portion of the coating material from the coating chamber 25 via overflow conduit 26 at a point below the level 31 of the fluidized bed. In said overflow a conveyor worm 32 is provided to convey overflowing coating material from overflow conduit 26 to discharge conduit 33 and into the return chamber 27. From the return chamber 27, the coating material may pass continuously via valved conduit 28 back into the coating chamber 25.

While this invention has been particularly described for use in the fluidized bed coating process, it should be understood that it may find utility in other fluidized bed processes.

I claim:

1. A method for coating articles in fluidized bed coating processes wherein pulverulent, heat-fusible coating materials are fluidized within the confines of an open-topped fluidization vessel and articles to be coated are heated to above the fusion temperature of said coating materials and, while so heated, immersed in said fluidized bed of coating materials and then withdrawn, the improvement comprising a method for obtaining improved fluidization of the coating materials in said fluidized bed by continuously withdrawing coating materials from said fluidized bed at an elevation below the free surface of said fluidized bed; conveying all of said withdrawn coating materials by mechanical means to an elevation above the free surface of said fluidized bed; and continuously discharging all of said elevated coating materials into said fluidized bed at a point spaced above the point at which said solids are being withdrawn, whereby a flow of circulating coating materials is established within said fluidized bed substantially countercurrent to the flow of fluidizing gases.

2. Apparatus for improving the fluidization of heat-fusible, pulverulent coating materials in fluidized bed coating processes including an open-topped fluidization chamber having impervious side walls, a lower gas-pervious distribution plate adapted to support a bed of pulverulent fluidized coating materials, and means for passing fluidizing gases upwardly through said gas distribution plate into said fluidization chamber; the improvement comprising:
- a generally vertically disposed partition extending from a point adjacent the open top of said fluidization chamber to a point adjacent said gas-pervious distribution plate, which partition divides said chamber into two zones;
- orifice means located in a lower portion of said partition adapted to permit the passage of pulverulent coating materials between said two zones;
- means for withdrawing fluidized coating materials from one of said zones at a point spaced below the normal upper free surface of coating materials fluidized within said chamber;
- mechanical means for elevating all of said withdrawn coating materials to above the normal free surface of coating materials fluidized within said chamber; and
- means for discharging all of said elevated solids into the other one of said zones.

3. Apparatus according to claim 2 in which said mechanical means comprise screw flights.

References Cited

UNITED STATES PATENTS

| | | | |
|---|---|---|---|
| 1,551,738 | 9/1925 | Fisher | 117—100 |
| 2,292,897 | 8/1942 | Nielsen | 259—4 |
| 2,586,818 | 2/1952 | Harms | 259—4 |
| 2,768,095 | 10/1956 | Tadema et al. | 117—100 |
| 2,790,782 | 4/1957 | Hillard | 117—100 |
| 2,930,748 | 3/1960 | Montgomery et al. | 208—91 |
| 3,001,228 | 9/1961 | Nack | 18—2.7 |
| 3,053,704 | 9/1962 | Munday | 118—429 |
| 3,112,274 | 11/1963 | Morganthaler et al. | 118—429 |
| 3,117,027 | 1/1964 | Lindlof et al. | 118—303 |
| 3,167,454 | 1/1965 | Tompson | 118—429 |
| 3,197,324 | 7/1965 | Brooks | 117—21 |
| 3,255,036 | 6/1966 | Kramer et al. | |

FOREIGN PATENTS

| | | |
|---|---|---|
| 852,638 | 10/1960 | Great Britain. |

MURRAY KATZ, *Primary Examiner.*

WILLIAM D. MARTIN, *Examiner.*

S. W. ROTHSTEIN, P. ATTAGUILE,
*Assistant Examiners.*